United States Patent [19]

Fréhaut et al.

[11] Patent Number: 4,514,628

[45] Date of Patent: Apr. 30, 1985

[54] COAXIAL MINIATURE MAGNETIC SPECTROMETER

[75] Inventors: Joël Fréhaut, Bruyeres le Chatel; Michel Roche, Dijon, both of France

[73] Assignee: Commissariat a l'Energie Atomique, Paris, France

[21] Appl. No.: 423,071

[22] Filed: Sep. 24, 1982

[30] Foreign Application Priority Data

Oct. 9, 1981 [FR] France ................................ 81 19029

[51] Int. Cl.[3] ................................................ B01D 59/44

[52] U.S. Cl. ...................................... 250/299; 250/298

[58] Field of Search ............. 250/298, 299, 300, 251.1

[56] References Cited

U.S. PATENT DOCUMENTS

| | | | |
|---|---|---|---|
| 2,932,738 | 4/1960 | Bruck | 250/298 |
| 2,945,125 | 7/1960 | Bruck et al. | 250/298 |
| 2,964,627 | 12/1960 | Wild | 250/299 |
| 3,356,976 | 12/1967 | Sampson et al. | 250/298 |
| 3,681,599 | 8/1972 | Takumi et al. | 250/299 |

FOREIGN PATENT DOCUMENTS

| | | |
|---|---|---|
| 1132636 | 3/1957 | France . |
| 2255596 | 7/1975 | France . |

*Primary Examiner*—Bruce C. Anderson

*Attorney, Agent, or Firm*—Pearne, Gordon, Sessions, McCoy, Granger & Tilberry

[57] ABSTRACT

The invention relates to a miniature magnetic spectrometer with a coaxial structure. This spectrometer, associated with a particle generator, comprises a transformer producing a magnetic field for deflecting the charged particles injected at one end of the spectrometer body. The transformer is provided with a secondary circuit, constituting the spectrometer body, formed by an external conductor in short-circuit with an internal conductor and coaxial to the external conductor. These two conductors define an annular space in which can move the charged particles. Means for detecting the deflected particles, disposed at a second end of the spectrometer body, means for selecting the particles in accordance with their injected angle and a converter element for the particles placed in the annular space level with the first end also being provided.

30 Claims, 7 Drawing Figures

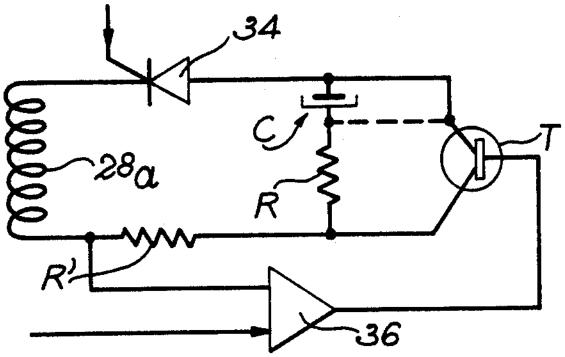
FIG. 2
FIG. 4a
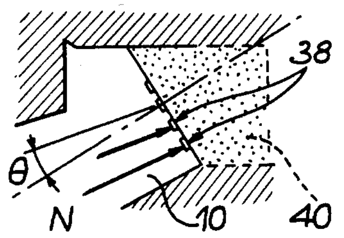
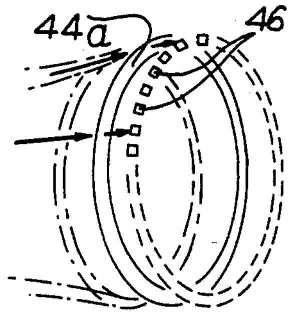
FIG. 3
FIG. 4c
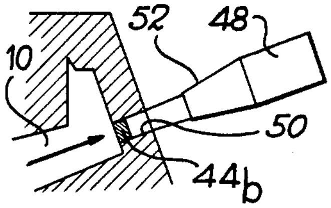
FIG. 4b
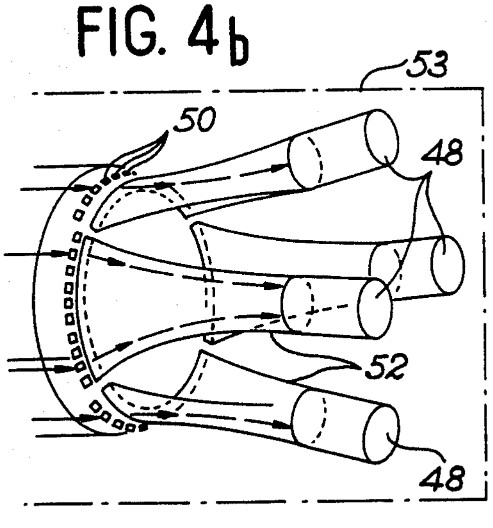
FIG. 4d
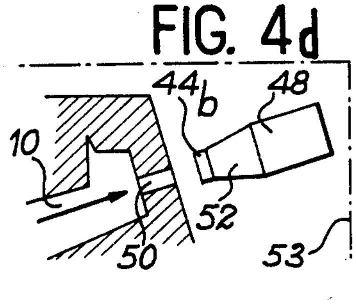

COAXIAL MINIATURE MAGNETIC SPECTROMETER

BACKGROUND OF THE INVENTION

The present invention relates to a miniature magnetic spectrometer with a coaxial structure. The spectrometer makes it possible to measure in a pulsating or continuous manner, the energy of various nuclear radiations constituted by charged or uncharged particles, such as neutrons, protons, alphas, gammas and various atomic radiations such as X-rays, etc.

The atomic or nuclear magnetic spectrometer is generally obtained by sorting charged particles (ions, electrons) representing either the incident radiation, or secondary particles from a reaction using an appropriate material, called the converter elements. These secondary particles are, for example, protons resulting from the nuclear transformation of a neutron into a proton or electrons emitted by the Compton effect or photoelectric effect. The charged particles corresponding to the incident radiation or to the secondary particles emitted are exposed to the action of an intense magnetic field, which justifies the expression magnetic spectrometer.

The hitherto known magnetic spectrometers are provided with magnetic circuits of the electromagnet type, which have prohibitive overall dimensions. In addition, these magnetic circuits produce poorly defined and weak intensity magnetic fields.

BRIEF SUMMARY OF THE INVENTION

The object of the invention is to provide a coaxial miniature magnetic spectrometer which obviates the above disadvantages. This spectrometer is of small size and the associated magnetic circuits create a clearly defined, high intensity magnetic field.

More specifically, the present invention relates to a magnetic spectrometer, wherein it comprises a transformer for creating a magnetic field for deflecting charged particles, injected at the first of the ends of the spectrometer body, said transformer being provided with a secondary circuit forming the spectrometer body and comprising an external conductor in short-circuit with an internal conductor, the latter being coaxial to the external conductor, said two conductors defining an annular space in which the charged particles can move, and means for detecting the deflected particles, said means being located at the second end of the spectrometer body.

The use of a coaxial magnetic structure makes it possible to inexpensively obtain a miniaturized spectrometer. The magnetic field created by such a spectrometer is very well defined, so that it is possible to accurately know the trajectories followed by the particles in the spectrometer body and consequently accurately analyse the width of an energy band or line.

According to a preferred embodiment of the invention, the bore of the external conductor and the internal conductor have a diabolo shape. This shape of the internal conductor and the bore of the external conductor is determined as a function of the trajectories followed by the particles, which are accurately known, because the radius of curvature of the trajectories is dependent on the intensity of the magnetic field, which is accurately known, and the mass of these particles.

According to a preferred embodiment of the invention, the transformer is provided with a primary circuit connected to a supply circuit, whereby the primary circuit is constituted e.g. by a series of spiral coils placed around a soft iron core and electrically interconnected. The supply circuit comprises e.g. a capacitor C, which can be charged by a d.c. voltage, connected in series with a resistor R. The assembly constituted by capacitor C and resistor R is connected to the terminals of the primary circuit, while means are provided for the pulsed discharge of capacitor C.

Moreover, the supply circuit comprises means for regulating the electric intensity supplied to the primary circuit during the discharge of capacitor C.

According to a preferred embodiment of the invention, the spectrometer comprises means making it possible to select charged particles in accordance with the angle at which they are injected into the body of the spectrometer. For example, these means are constituted by a series of thin plates made from an insulating material and equidistant from one another. They are fixed in radial directions in the annular space.

The use of these selection means makes it possible to easily detect the particles as a function of the trajectory which they follow in the spectrometer, so that it is possible to considerably improve the signal-to-noise ratio compared with conventional spectrometers.

As stated hereinbefore, the spectrometer according to the invention makes it possible to measure the energy of nuclear or atomic radiation constituted by charged or uncharged particles. In the case of uncharged particles, the spectrometer according to the invention has an annular converter element, which can be bombarded by the uncharged particles and after this bombardment can emit charged particles. This converter element is placed in the annular space level with the first end of the spectrometer body and the nature of this element is a function of the nature of the uncharged particles which it is desired to analyse.

BRIEF DESCRIPTION OF THE DRAWINGS

The invention is described in greater detail hereinafter relative to non-limitative embodiments and the attached drawings, wherein show: FIG. 2 the diagram of the supply circuit for the primary circuit of the transformer. FIG. 3 a first embodiment of the charged particle detection means of the spectrometer according to the invention.

FIGS. 4*a* to 4*d* variants of a second embodiment of the charged particle detection means of the spectrometer according to the invention.

DETAILED DESCRIPTON OF THE PREFERRED EMBODIMENTS

Figure 1:
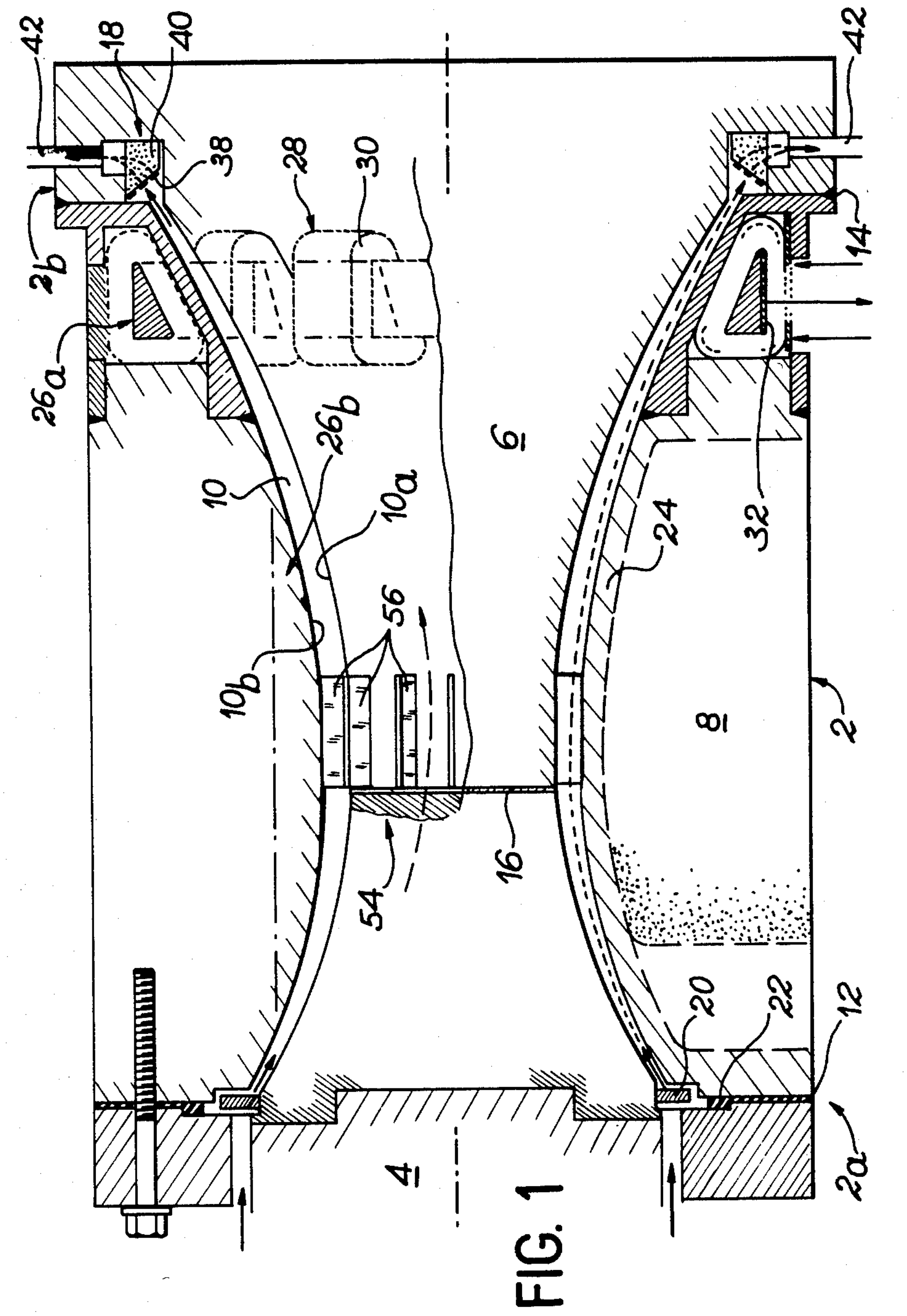
FIG. 1 in longitudinal section, an overall diagram of the spectrometer according to the invention.

FIG. 1 shows in longitudinal sectional form, a magnetic spectrometer according to the invention. This spectrometer, designated by the general reference numeral 2, is associated with a particle collimator 4, whereof only the final part is shown, because, as it does not form part of the invention, it has not been shown in its entirety and will not be described hereinafter. However, it should be noted that the latter can be integrated into the spectrometer in order to avoid alignment difficulties.

According to the invention, the body of spectrometer 2 is constituted by two coaxial conductors, namely an internal conductor 6 and an external conductor 8. These two conductors define an annular space 10 in which can be displaced the charged particles from collimator 4, whose function is to select the particles which are parallel to the axis of revolution of the spectrometer body. Moreover, these two conductors 6 and 8 are short-circuited at the ends *2a*, *2b* of the spectrometer body by means of two welds 12, 14. The welding of these two conductors can be performed at low temperature, e.g. approximately 75° C. with a vacuum furnace welding method.

According to the invention, the internal conductor 6 and the bore of the external conductor 8 in which the internal conductor 6 is located, have a diabolo shape. In FIG. 1, said diabolo has at its end located on the side of end *2a* of the spectrometer, a diameter which is smaller than that of the other end thereof, located on the side of the end *2b* of the spectrometer body. Obviously, this is only an exemplified embodiment and the end of the diabolo located on the side of end *2a* of the spectrometer body could have a diameter which is larger or equal to that of the other end thereof. The relative size of the diameters of the diabolo ends is dependent on the dimensioning adopted for the spectrometer.

In order to facilitate the assembly of the two conductors, internal conductor 6 can be made in two parts, which are welded together in the manner described hereinbefore. The break of the internal conductor and consequently its welding 16, can be performed in the narrowest part of the internal conductor in the form of a diabolo. This narrowest part is called hereinafter the groove circle.

In addition, the magnetic spectrometer comprises detection means 18 used for detecting the charged particles from collimator 4. The detection means 18 are positioned level with end *2b* of the spectrometer body. The nature and operation of these detection means will be described in greater detail hereinafter.

As stated hereinbefore, the spectrometer according to the invention can be used for analysing charged or uncharged particles. In the case where the particles to be analysed and coming from collimator 4 are not charged, the spectrometer must be provided with a converter element 20. This annular converter element 20 is disposed in annular space 10, defined by conductors 6, 8, level with end *2a* of the spectrometer body.

This converter element, which is exposed to the bombardment of uncharged particles (neutrons, gamma photons, X-photons, etc) is able to emit charged particles (ions, electrons, etc). The nature of this element is a function of the nature of the uncharged particles which it is desired to analyse.

In the case where the particles to be analysed are neutrons, the converter element can, for example, be formed by a fine layer of hydrogenated material, whose thickness can vary according to the sought brightness levels, i.e. from 1 to 300 μm. The annular geometry of the converter element and its thickness in certain cases exclude the direct use of a plastic sheet. Therefore, in order to facilitate the handling of the latter, it can be bonded to a metal sheet.

In the case where the particles to be analysed are X-photons, the converter element must be made from a material with a high atomic number (Z), such as tungsten or lead, so that the photoelectric effect completely preponderates.

The assembly of the converter element takes place at the same time as the assembly of the two conductors 6, 8. To prevent any overlap of weld 12 over the converter element, an O-ring 22 can be located in annular space 10. This O-ring, made e.g. from a material known under the trade mark Viton, also makes it possible to ensure a good sealing with respect to the vacuum present in the spectrometer. The above arrangement makes it possible to maintain a vacuum of approximately 0.5 Torr.

According to the invention, the two conductors 6 and 8 in short-circuit, form the secondary circuit of a transformer. Knowing the shape of the secondary circuit formed by a single loop, it is clear that a moderate energy will be adequate to produce very high intensity currents and consequently to produce an intense magnetic field, permitting the deflection of charged particles moving in the annular space 10.

In order to produce intense currents in the secondary circuit, it is necessary to produce the latter in such a way that it has the lowest possible resistance. The use of solid copper is recommended for this, but the skin effect limits the active part to a thin film of 0.1 to 2 mm, so that in certain cases the conductors 6 and 8 form the secondary circuit and are made from a heavy metal, such as lead or tungsten, covered with a thin copper film 24. This transformer is provided with an annular soft iron core which, located in external conductor 8, can either be placed in the vicinity of end *2b* of the spectrometer body, in which case it carries reference **26*a*, or in the central part of conductor 8 and in the vicinity of internal conductor 6, i.e. level with the groove circle. In the latter case, the soft iron core carries reference 26*b*** and can be made in the form of a laminated core.

In order to obtain a maximum shielding effect and the smallest possible volume to be magnetized, the secondary circuit of the transformer must be as compact as possible. This also applies with regards to the transformer core (the core section being a few $cm^2$), so that it is placed in the external conductor and has small dimensions.

According to the invention, the primary circuit of the transformer 28 is constituted by a series of n spiral coils 30, disposed around the soft iron core **26*a* or 26*b*. These n coils 30, e.g. in an even number, can be arranged in series in pairs in such a way that each of them has n/2 turns. The arrangement in series of these coils can be effected by means of conductive strips 32 made e.g. from copper surrounding the soft iron core 26*a* or 26*b*, the central turn of each coil 30 being welded to the conductive strip 32**. These coils can be supplied at the outside either by symmetrical voltages or by asymmetrical voltages. In this case, one of the coils is connected to earth. This is possible because the soft iron core is insulated.

In order to reduce the magnetizing energy necessary for the operation of the spectrometer and prevent energy losses, the resistance of the primary circuit must be as low as possible. For this purpose, coils 30 can be produced from a spirally wound conductor and can be formed by several copper sheets, which are insulated from one another. The insulation of each of these sheets and the holding together thereof is advantageously realised by using an epoxy resin-impregnated glass cloth as the insulant.

The supply circuit for the primary circuit is shown in FIG. 2. To simplify the circuit diagram, the primary circuit has been represented by a single coil **28*a***.

The supply of primary circuit **28*a* is ensured by the discharge of a capacitor A (a few $10^{-2}$F.), connected to the terminals of primary circuit 28*a*. The discharge of capacitor C, charged beforehand by a d.c. voltage (a few hundred volts) can be initiated e.g. by a thyristor 34**.

For reasons which will be given hereinafter, the intensity supplied to the primary circuit must be regulated. The regulation can be obtained by "truncating" part of the discharge of the capacitor. This can be carried out by a transistorized device, which can be made dependent on the measurement of the current effectively supplied to the primary circuit 28*a* of the transformer. The regulation of the intensity supplied to the primary circuit can be obtained in two different ways.

The first way, called series regulation, consists of modifying the voltage at the terminals of the primary circuit 28*a*, in order to control the current thereof. For this purpose, a resistor R is arranged in series with capacitor C in such a way that the assembly constituted by capacitor C and resistor R in series is connected to the terminals of primary circuit 28*a*. The voltage drop at the terminals of resistor R is modulated by a group of parallel-connected transistors T.

To simplify the circuit diagram, FIG. 2 only shows a single transistor T. The collector and emitter of transistor T are connected to the terminals of resistor R and the base thereof to a servo system mainly formed by an operational amplifier 36. The output of the amplifier is connected to the base of transistor T, one of its inputs being connected to earth (or reference voltage) and its other input to the emitter of transistor T via a resistor R'. The measurement of the current effectively supplied to primary circuit 28*a* is carried out by taking the voltage at the terminals of resistor R'.

The second way, called parallel regulation, consists of placing, as hereinbefore, a resistor R in series with capacitor C so as to increase the internal impedance of the regulating circuit, but on this occasion, part of the discharge current of capacitor C is derived by means of the group of transistor T. The collector and emitter of transistor T are connected to the terminals of the assembly formed by the series-connected capacitor C and resistor R, and the base of transistor T is connected to the servo system. As hereinbefore, the measurement of the current effectively supplied to the primary circuit 28 is carried out by taking the voltage at the terminals of resistor R'.

The choice between these two type of circuits depends on the value of the transformation ratio N. When N is very high, it is necessary to use the series arrangement, because the current is low enough to be completely transmitted through transistors T and the voltages are too high, bearing in mind the existing technology of transistors, for the parallel arrangement.

Conversely, when the transformation ratio N is low, the currents are high and it is no longer possible to arrange the transistors in series in the circuit. The only solution then consists of deriving a fraction of the current (approx. 3%) as in the parallel arrangement, which is made possible due to the low voltages used.

It should be noted that the transformation ratio N is essentially dependent on the effort to limit the existence of the primary circuit. Studies have shown that N must be between 30 and 60 and that as a result through the number of turns of the secondary circuit being equal to 1, the number of turns of the primary circuit will be between 30 and 60. Moreover, through choosing N between 30 and 60, it is possible to solve the problems due to the skin effect appearing in the secondary circuit of the transformer.

Thus, the regulation of the current supplied to the primary circuit is used for regulating the current supplied to the secondary circuit, these two currents being linked by the simple expression $I_s = NI_p$ in which $I_s$ and $I_p$ respectively represent the current supplied to the secondary circuit and that supplied to the primary circuit.

This regulation of the current supplied to the secondary circuit is necessary for maintaining the trajectories of the particles in annular space 10. Thus, in order to reduce the energy necessary for the operation of the spectrometer, the volume to be magnetized, which is in fact annular space 10, must be as small as possible. This is in part realised by the shape of this annular space, defined by the diabolo shape of internal conductor 6 and the bore of external conductor 8, in which the internal conductor is located.

To further reduce the volume to be magnetized the inner wall 10*a* (FIG. 1) of annular space 10 and the outer wall 10*b* thereof must be tangential, respectively to the trajectories of the most internal particles and to the trajectories of the most external particles. One of these trajectories is shown by dotted lines in FIG. 1. It should be noted that the trajectories followed by the charged particles are dependent on their nature.

In view of the fact that the trajectory followed by the particles is dependent on the magnetic field produced by the transformer and consequently of the current supplied to the secondary circuit, it is readily apparent that the current supplied must be very well defined. The regulation of the current supplied to the primary circuit and consequently to the secondary circuit makes it possible to obtain a current, supplied to the secondary circuit, defined with an accuracy of $5 \cdot 10^{-3}$. In the case where high energy protons are analysed, the current supplied to this circuit can be between 5 and 10,000 amperes. It should be noted that the intensity of the current used is dependent on the intensity of the magnetic field which it is desired to obtain. In particular, the detection of gamma or X-photons, detected by means of electrons, requires lower magnetic fields than the detection of neutrons, detected by means of protons.

In order to obtain a miniature spectrometer, the secondary circuit of the transformer and consequently its soft iron core 26, the latter being located in the external conductor 8 forming part of the secondary circuit, must be as small as possible. Thus, to obtain a good operation of the spectrometer, it is possible to "premagnetize" the soft iron core of the transformer, so that the magnetization saturation point is reached before the pulse produced by the discharge of capacitor C. For example, this premagnetization can be achieved by means of a continuous supply connected to the terminals of the primary circuit of the transformer.

As stated hereinbefore, the spectrometer according to the invention, comprises means 18 making it possible to detect the charged particles from particle collimator 4 or converter 20. The detection of the particles can be obtained in different ways.

The first way consists of a detection, or direct collection of the particles. In this case, the detection means are formed, in the manner shown in FIGS. 1 and 3, by a series of small detectors formed by thin metal plates 38, appropriately spaced as a function of the desired resolution. These thin plates 38 can be obtained by the metallization of an annular ceramic member 40 disposed in annular space 10.

In the case where the plates 38 are arranged in such a way that the charged particles arrive perpendicularly thereto (FIG. 1), detection takes place without any amplification of the detected signal, i.e. without emission of secondary particles. This is linked with the fact that the magnetic field curves the trajectories and then returns them into plates 38, according to an extremely small radius of gyration.

The electric supply cables 42 of detection means 18, connected to not shown, per se known supply means located outside the spectrometer, are as far as possible kept within the external conductor 8, by making them pass out of the spectrometer body in radial directions, so as to obtain a good magnetic shielding.

In the case when it is desired to reduce to a maximum the background noise, such as during the detection of electrons emitted by the Compton effect by converter element 20, it can be of interest to use the magnetic field, created by the transformer, to effect a magnetic insulation of the detection means. For this purpose, it is merely necessary for the detection means to be located at at least two Larmor radii of the spectrometer walls.

In the case where the plates 38 are arranged in such a way that the charged particles reach them at a certain angle $\theta$, which is between the trajectory of the particles and the normal N to the plates (FIG. 3), detection takes place with an amplification of the detected signal, linked with the emission of secondary particles such as electrons. The gain of this amplification can be between 3 and 5, as a function of the nature of plates 38 and the angle of incidence $\theta$. In order to obtain a good detection efficiency, angle $\theta$ is approximately 20°.

It should be noted that this detection method requires the use of a vacuum below $10^{-3}$ Torr and a precise arrangement of the small detectors.

The second way consists of detecting the charged particles by scintillation. In this case, the detection means shown in FIG. 4, are formed by one or more scintillators 44*a*, 44*b* associated either with several photodiodes 46, or with one or more photomultipliers 48. The choice between photodiodes and photomultipliers is dependent on the desired sensitivity. It should be noted that the sensitivity of the spectrometer is much higher when using detection by scintillation in place of direct detection.

When the detection means are formed by a plurality of miniature photodiodes 46 associated with a single annular scintillator 44*a*, located in the annular space 10 and facing the same (FIG. 4*a*) the photodiodes can be placed in the same annular space 10 in the form of an annular ring. In the same way, when the detection means are constituted by several photodiodes 46, associated on each occasion with a single scintillator 44*b*, said scintillators and said photodiodes can be arranged in the form of a ring and can be positioned in annular space 10. Obviously, the operation of the photodiode should be checked in the presence of the magnetic field existing in the spectrometer.

When the detection means are formed by one or more photomultipliers 48, which are positioned outside the spectrometer due to their size, these photomultipliers being associated with one or more scintillators 46*a* or 46*b*, it is necessary to provide in the vicinity of end 2*b* of the spectrometer, a series of holes 50 (FIG. 4*b*) arranged in the form of a ring facing annular space 10, so as to detect the charged particles.

Studies have shown that the existence of the holes 50 does not disturb the operation of the spectrometer.

In this embodiment, the annular scintillator 44*a* or the various scintillators 44*b* can be positioned outside the spectrometer, which is illustrated by FIGS. 4*b* and 4*d*. FIG. 4*d* corresponds to the use of several photomultiplier tubes, each associated with a small scintillator. These scintillators can be integral with the photomultiplier tubes or tube and can be positioned facing holes 50 or can be connected to the tubes by means of light guides 52. These light guides can be solid, or can be formed by optical fibres. Bearing in mind that the detection of the particles takes place outside the spectrometer, the complete spectrometer must be placed in a vacuum enclosure 53.

Moreover, in view of the very high detection gain, for each measuring point it is only necessary to use part of the scintillator or scintillators (FIG. 4*b*). This makes it possible to have detectors corresponding to the different energies of the particles to be detected, said detectors being arranged in ring-like manner around the spectrometer.

When several scintillators are used, which are associated with one or more photomultiplier tubes 48, said scintillators 44*b* can be located in the holes 50 (FIG. 4*c*) and connected to the photomultiplier tubes by light guides 52.

The third way consists of using solid detectors placed within the annular space in the form of an annular ring. However, in view of the characteristics and shapes of the detectors, it would not be very advantageous to use them, in view of the very poor signal-to-noise ratio.

The spectrometer according to the invention also comprises means 54 making it possible to select the charged particles in accordance with the angle under which they are injected into the spectrometer body. These selection means or diaphragm are shown in FIG. 1. The diaphragm is constituted by a series of thin plates 56 of thickness between 0.1 and 0.3 mm, made from an insulating material such as alumina, epoxy glass or various laminates. These plates 56 are disposed within the annular space 10 in accordance with radial directions, so as to totally close the annular space 10. Moreover, the said plates are equidistant.

In order to bring about maximum simplification of the construction of the diaphragm, the latter can be located at the groove circle, i.e. in the vicinity of weld 16 of internal conductor 6. Moreover, in order not to disturb the symmetry of revolution of the magnetic field, the installation of the diaphragm in the spectrometer must take place without making channels in the internal conductor 6 and external conductor 8. The diaphragm can be fixed by welding.

The spectrometer according to the invention makes it possible to detect a large number of particles with a very good resolution and a very great sensitivity. In particular, it makes it possible to measure a neutron line of 14 MeV with a resolution of approximately 50 KeV and the detection of a source emitting $10^{24}$ neutrons/-second with an energy of 14 MeV.

It also permits the analysis, with a substantially constant resolution, of a complete energy spectrum without having to use a plurality of spectrometers, which would in each case only have observed one energy band.

The present spectrometer has limited overall dimensions. It has a length of 300 mm, a diameter of 180 mm and a supply circuit contained in a cubic box of side length 30 cm. Its low overall dimensions and relatively low cost make it a device which can be manufactured in standard manner, so that it can be used in routine form.

Moreover, the space charge problems leading to a loss of resolution and even to a loss of particles on the walls in the case of a strong particle current, causing important disturbances in the operation of the spectrometer, have only a negligible influence, in view of the construction of the spectrometer.

What is claimed is:

1. A magnetic spectrometer, comprising a body forming a secondary circuit of a transformer for creating a magnetic field for deflecting charged particles, said body being formed by an external conductor provided with a bore and by an internal conductor in short-circuit with said external conductor, said bore and said internal conductor having a diabolo shape around a common axis, said body having two opposite ends in the direction of said axis, said two conductors defining an annular space in which the charged particles can move, said particles being injected at a first of said ends of the body, and means for detecting the deflected particles, said means being located at the second end of the body.

2. A magnetic spectrometer according to claim 1, wherein the transformer is provided with an annular soft iron core, located in the external conductor in the vicinity of the second end of the spectrometer body.

3. A magnetic spectrometer according to claim 1, wherein the transformer is provided with an annular laminated soft iron core located in the central part of the external conductor in the vicinity of the internal conductor.

4. A magnetic spectrometer according to claims 2 or 3, wherein the transformer is provided with a primary circuit connected to a supply circuit, said primary circuit being constituted by a series of spiral coils arranged around the soft iron core and electrically interconnected.

5. A magnetic spectrometer according to claim 4, wherein, as the number of coils is even, said coils are arranged in series in pairs, the electrical connection between the coils being ensured by means of a conductive strip surrounding the soft iron core, to which is fixed the central turn of each coil.

6. A magnetic spectrometer according to claim 4, wherein the number of turns is between 30 and 60.

7. A magnetic spectrometer according to claim 4, wherein each coil is made from a helical conductor, constituted by a plurality of metal sheets, held together and insulated from one another by means of an insulant.

8. A magnetic spectrometer according to claim 7, wherein the metal sheets are made from copper and the insulant is formed from an epoxy resin-impregnated glass cloth.

9. A magnetic spectrometer according to claim 8, wherein the supply circuit for the primary circuit comprises a capacitor C, which can be charged by a d.c. voltage and connected in series to a resistor R, the assembly being constituted by capacitor C and resistor R and being connected to the terminals of the primary circuit, and means for discharging the capacitor in pulsed manner are provided.

10. A magnetic spectrometer according to claim 9, wherein the supply circuit also comprises means for regulating the electrical intensity supplied to the primary circuit during the discharge of capacitor C.

11. A magnetic spectrometer according to claim 10, wherein the regulation means are constituted by a transistor, whose collector and emitter are connected to the terminals of resistor R and whose base is connected to a system controlling the electrical intensity supplied to the primary circuit.

12. A magnetic spectrometer according to claim 10, wherein the regulation means are constituted by at least one transistor, whose collector and emitter are connected to the terminals of the assembly, constituted by capacitor C and resistor R connected in series, and whose base is connected to a system making it possible to control the electrical intensity supplied to the primary circuit.

13. A magnetic spectrometer according to claim 4, wherein the servo system is constituted by an amplifier, whose output is connected to the base of the transistor, and whereof one of the inputs is connected to earth and the other input is connected to the emitter of the transistor by means of a resistor R'.

14. A magnetic spectrometer according to claim 9, wherein the means for discharging capacitor C are constituted by a thyristor.

15. A magnetic spectrometer according to claim 1, wherein the detection means are constituted by a series of thin metal plates produced on an annular ceramic member disposed in the annular space.

16. A magnetic spectrometer according to claim 5, wherein the metal plates are disposed in such a way that the charged particles arrive perpendicularly on said plates.

17. A magnetic spectrometer according to claim 15, wherein the metal plates are disposed in such a way that the charged particles reach them at an angle $\theta$, defined relative to the normal to the plates and which is approximately 20°.

18. A magnetic spectrometer according to claim 1, wherein the connection means are constituted by several miniature photodiodes disposed in the form of a ring in the annular space, said photodiodes being associated with one or more scintillators positioned facing the photodiodes.

19. A magnetic spectrometer according to claim 1, wherein the detection means are constituted by at least one photomultiplier tube, positioned at the end of the spectrometer body, associated with at least one scintillator, the second end of said body having a series of holes arranged in ring-like manner facing the annular space, in such a way that the charged particles can be detected.

20. A magnetic spectrometer according to claim 9, wherein the scintillators are positioned facing the holes and outside the spectrometer body, the spectrometer then being placed in a vacuum enclosure.

21. A magnetic spectrometer according to claim 19, wherein the scintillators are disposed within the spectrometer body and are connected to the photomultiplier tube by means of light guides.

22. A magnetic spectrometer according to claim 21, wherein the scintillators are disposed within the holes.

23. A magnetic spectrometer according to claim 20, wherein it also comprises means making it possible to select the charged particles according to the angle under which they are injected into the spectrometer body.

24. A magnetic spectrometer according to claim 23, wherein the selection means are constituted by a series of thin equidistant insulating plates fixed in the annular space in accordance with radial directions.

25. A magnetic spectrometer according to claim 24, wherein the selection means are arranged level with the narrowest region of the diabolo.

26. A magnetic spectrometer according to claim 1, wherein it also comprises an O-ring disposed in the annular space level with the first end of the spectrometer body.

27. A magnetic spectrometer according to claim 15, wherein the detection means are connected to electric supply means via cables passing out of the spectrometer body in accordance with radial directions.

28. A magnetic spectrometer according to claim 1, wherein the external conductor and the internal conductor are made from a heavy metal covered by a copper film.

29. A magnetic spectrometer according to claim 5, wherein the conductive strip covering the soft iron core is made from copper.

30. A magnetic spectrometer according to claim 1 applied to the measurement of the energy of a nuclear or atomic radiation constituted by uncharged particles, wherein it comprises an annular converter element, which can be bombarded by the uncharged particles and which is able to emit, as a result of the bombardment, charged particles, said converter element being positioned in the annular space level with the first end of the spectrometer body, the nature of said element being a function of the nature of the uncharged particles.

* * * * *

UNITED STATES PATENT AND TRADEMARK OFFICE
CERTIFICATE OF CORRECTION

PATENT NO. : 4,514,628

DATED : April 30, 1985

INVENTOR(S) : Joel Frehaut, Michel Roche

It is certified that error appears in the above-identified patent and that said Letters Patent are hereby corrected as shown below:

Claim 13, Column 10, line 11, "claim 4" should read as "claim 11".

Signed and Sealed this

*Tenth* Day of *September 1985*

[SEAL]

*Attest:*

DONALD J. QUIGG

*Attesting Officer* *Acting Commissioner of Patents and Trademarks - Designate*